Aug. 21, 1934.           W. EHRLICH           1,970,955
                         DELIVERY WAGON
              Filed July 29, 1932       2 Sheets-Sheet 2

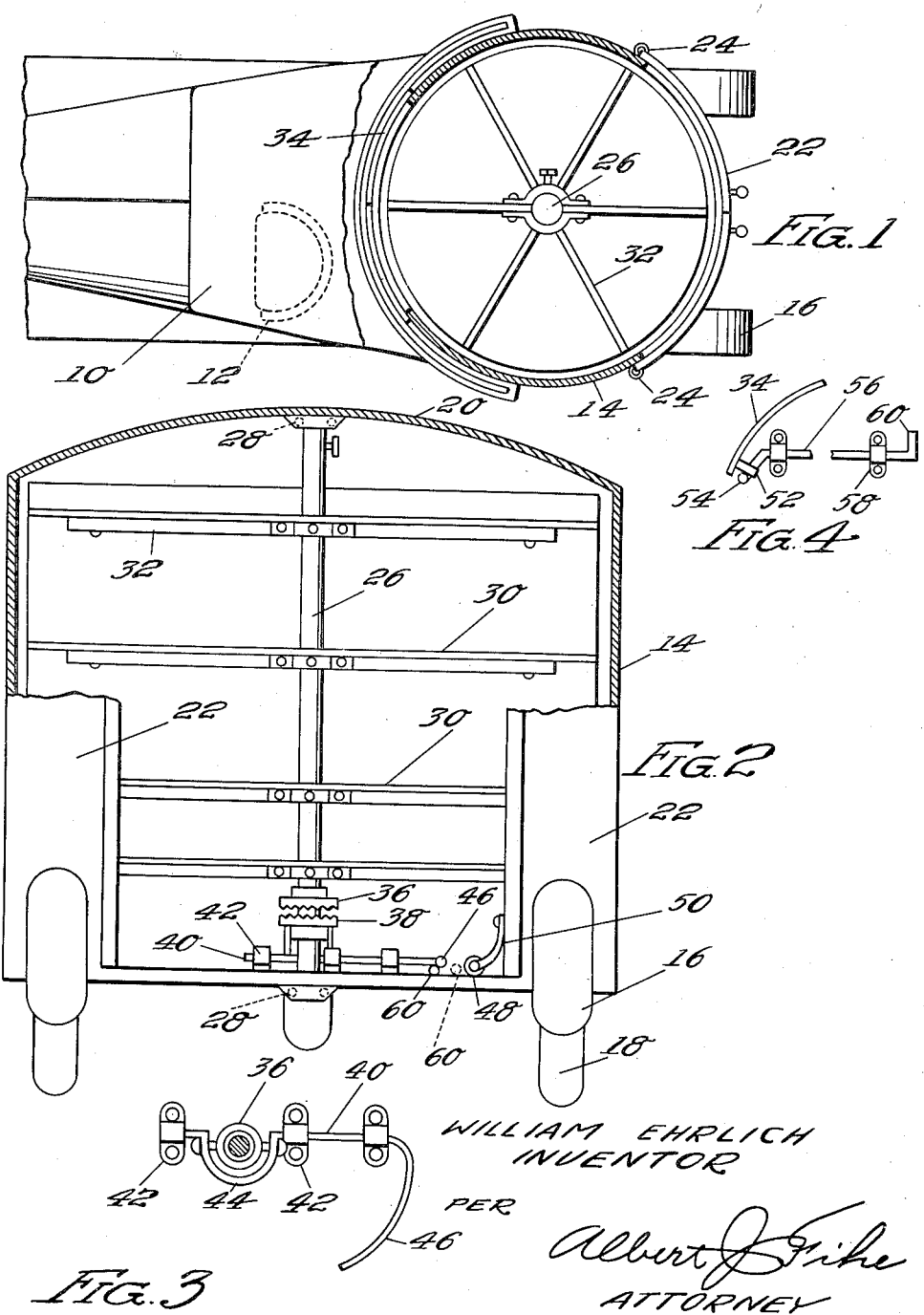

WILLIAM EHRLICH
    INVENTOR
PER
                ATTORNEY

Patented Aug. 21, 1934

1,970,955

UNITED STATES PATENT OFFICE 1,970,955

DELIVERY WAGON

William Ehrlich, Chicago, Ill.

Application July 29, 1932, Serial No. 625,678

2 Claims. (Cl. 296—1)

This invention relates to an improved delivery wagon, and has for one of its principal objects the provision of a delivery wagon, truck or the like wherein a considerably increased amount of commodities may be carried for delivery purposes and wherein the same may be handled with considerable more ease and expedition than has heretofore been possible.

One of the important objects of this invention is to provide in a delivery truck or the like for various commodities, particularly relatively small articles which are delivered to the trade or to retail customers, means for arranging or grouping the articles in some desired order either for handling or delivery purposes, and wherein all of the commodities are conveniently accessible to the driver or operator of the truck whenever desired.

Another and further important object of the invention resides in the provision of a delivery wagon or truck for handling relatively small articles of merchandise such as bakery goods, pies or the like, and wherein provision is made for ready access to selected portions of commodity supporting racks for easy withdrawal of certain kinds of articles.

A further important object of the invention resides in the provision of a modified form of delivery truck wherein a rotatable rack suitable for the selective positioning and handling of various kinds of commodities is mounted on the truck and wherein certain portions of the rack are readily accessible for handling or delivery purposes.

Another object of the invention is the provision of a delivery vehicle which can be quickly and economically loaded for route deliveries with a minimum expenditure of time and labor both in the loading and delivering operations.

A still further object of the invention includes a modified form of device wherein a removable rotatable rack is provided for storage and delivery purposes which rack can be filled with various articles in the store or plant and then placed fully loaded into the truck for delivery purposes while at the same time another rack or racks is being charged or loaded for insertion into the truck upon the return of same with the first rack empty.

Other and further important objects of the invention will be apparent from the disclosures in the accompanying drawings and following specification.

The invention, in a preferred form, is illustrated in the drawings and hereinafter more fully described.

In the drawings:

Figure 1 is a top plan view of a delivery truck embodying the improved construction of this invention, portions being broken away to show the interior.

Figure 2 is an open rear view of a delivery truck constructed in accordance with the principles of this invention.

Figure 3 is a detail view of a portion of the locking means for the rotatable rack, this locking means being also illustrated in Figure 2.

Figure 4 is a detail view of an automatic release means for the lock, this being operated in conjunction with another door to the storage compartment.

As shown in the drawings:

Figure 5:
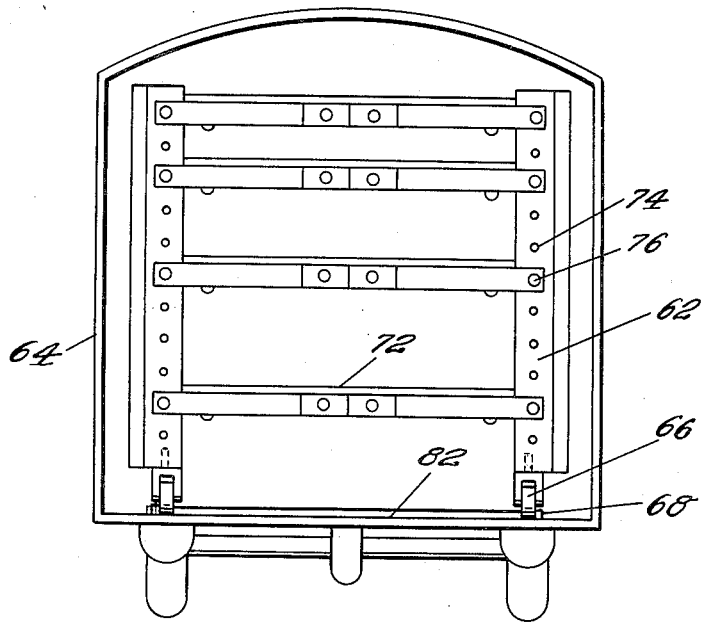
Figure 5 is a rear view of a delivery truck, showing a modified form of the invention.
Figure 7:
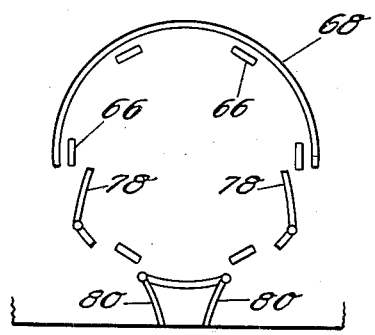
Figure 7 is a detail view showing the improved means for removably retaining the rotatable rack of Figures 5 and 6 in the delivery truck.
Figure 6:
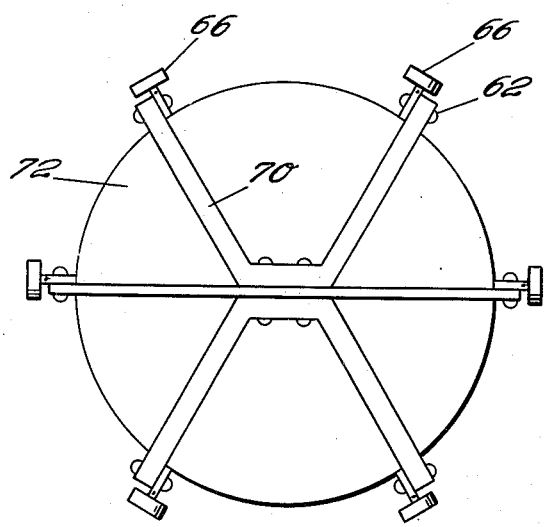
Figure 6 is a top plan view of the rotatable rack shown in Figure 5.
Figure 8:
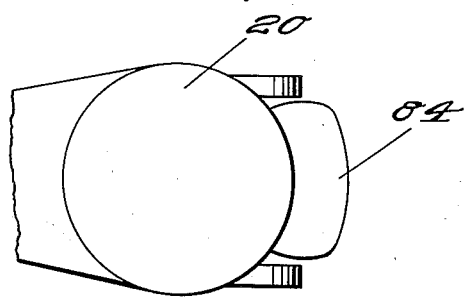
Figure 8 is a top plan view of the rear portion of the truck.

The reference numeral 10 indicates generally the body portion of a delivery truck having a driver's seat 12 and having mounted on its rear end a cylindrical body 14 provided with the usual fenders 16 and supporting wheels 18.

The cylindrical body 14 may be of any desired or convenient height and is preferably surmounted by a domed top or the like 20 and is provided with doors 22 at the rear end thereof, the doors being supported in position by means of hinges 24.

Rotatably mounted in the center of the cylindrical casing 14 is a shaft 26 preferably supported by suitable ball bearings or the like 28 at the top and bottom thereof, and on this shaft is mounted a plurality of supporting racks or platforms 30.

These supporting racks or platforms are circular in shape to correspond to the interior dimensions of the cylindrical body 14 and are mounted on suitable brace members or brackets 32. These brackets may be adjustably fixed on the shaft 26 whereby the distance between the shelves 30 can be varied as desired or convenient.

The shelves 30 are provided for the storage thereupon of various commodities, and each shelf may be divided into a plurality of compartments by means of extensions of the brackets or braces 32 or the shelves may simply be left open for the placing thereon of commodities to be carried and delivered by means of the truck.

As an example, the truck is particularly well-adapted for the delivery of pies or bakery products wherein the operator or driver requires convenient access to the interior of the truck for the purpose of obtaining therefrom pies of various flavors, these pies having been previously arranged in suitably selected or labeled compartments whereby withdrawal of any desired flavor or kind of pie is rendered quite easy and convenient. It will be evident, however, that any other kinds of commodities may be transferred and delivered by vehicles of this sort and that instead of shelves simply supporting brackets may be used with hooks thereon or other means of support can be employed, while at the same time incorporating and retaining the rotatable feature.

When the truck has been loaded and the operator desires to remove certain of the articles therefrom, he may, at his option, open the rear doors 22 and turn the revolving rack into proper or suitable position for ready access to those portions thereof whereon repose the desired articles.

In order to make operation still more easy, a sliding door is provided in the front portion of the compartment as shown at 34 in Figure 1, which door closes an opening directly behind the space adjacent the driver's seat as indicated, the door when open sliding between panels of the cylindrical container 14 into a position directly behind the driver's seat. In this manner, ready access is provided to any selected one of the compartments of the rack whereby articles of merchandise can be withdrawn by the operator without the necessity of going around to the rear of the truck.

In order to prevent undesirable rotation of the rack and shelves while the truck is in operation, as might happen when the same is turning corners or the like, a suitable locking means is provided on the shaft 26, this comprising essentially a pair of juxtaposed plates 36 and 38, each having a series of peripheral teeth or jagged edges, one of the plates 36 being fixed to the shaft and the other 38 being non-rotatably mounted with respect to the bed 40 of the truck.

The plate 38 is slidably mounted on the shaft 36 and provision is made for raising the same into locking contact with the plate 36, this comprising preferably an operating rod or shaft 40 mounted in suitable bearings 42 and provided with an offset 44 which is connected to the under-face of the plate 38, so that when the handle 46 of the crank shaft 40 is moved upwardly, a locking relationship is established between the plate 38 and the plate 36 on account of the corresponding upward motion of the plate 38. This movement of the locking lever 40—46 is automatically accomplished by the closing of the door 22, the same being provided with a roller or the like 48 which is mounted on an extension 50 preferably composed of spring steel which roller, when the door 22, is closed rides under the end 46 of the locking lever and raises the same sufficiently to form a locking contact between the plates 36 and 38. In this manner the rack is positively locked against undesirable circling whenever the doors 22 are closed.

In order to allow access to and rotation of the rack through the means of the slidable door 34, an extension or pin 52 is provided on the door 34 which pin contacts with a latch element or the like 54 forming an extension of a shaft 56 which is mounted in suitable bearings 58 in the floor of the truck, and the end of which extends into operative relationship with the roller 48.

The end 60 of the rod 58 normally occupies the position shown in full lines in Figure 2, but when the door 34 is opened, this end 60 is moved by means of a pin 52 and extension 54 into the position shown in dotted lines in Figure 2, whereupon the roller 48 is pushed out from under active contact with the trip or locking lever 46, thereby allowing the same and the connected plate 38 to drop, whereupon the rack is left free for rotation about the shaft 26. The fact that the support 50 for the roller 48 is composed of spring steel makes this operation feasible and possible.

In Figure 5 is illustrated a modification of the invention wherein the central shaft is dispensed with and a supporting rack or the like 62 is removably positioned in a cylindrical body 64 of the delivery truck, this rack being of suitable dimensions to correspond with the chamber 64 and mounted on swiveled rollers 66 which rollers are retained in proper position with respect to the cylindrical container by means of a circular rail or track 68. The rack shown in Figure 5 consists essentially of uprights and cross-pieces 70 on which cross-pieces are supported a plurality of circular platforms or the like 72. These circular platforms can be adjusted vertically with respect to the support 62 by means of openings or the like 74 formed in the supports and into which are passed pins, rivets, bolts or the like 76 for the purpose of retaining the shelves 72 in desired position with respect to each other and on the vertical supports 62.

This particular rotatable rack is adapted to be withdrawn for loading purposes, this being accomplished by means of switches 78 and 80 which form part of the circular track 68 and which may be opened manually or otherwise to allow of a ready withdrawal of the rack or support 70—72.

It will be noted that two of the rollers or supporting wheels 66 are aligned with the open switches 78 whenever it is desired to withdraw the rack, this automatically aligning the other four rollers with suitable openings in the rail 68 formed by desired positioning of the switch members 80. The entire bottom 82 of the truck is preferably composed of a sheet of steel or sheet iron so that suitable and ready operation of the rollers 66 thereover is accomplished. Obviously, other means may be employed for withdrawal of the rack from the body 64 and the rollers 66 provide ready means of transportation of the rack over floors or the like to any desired destination of the factory or shipping department whence, after the same has been lowered, it can be readily inserted into the truck for delivery purposes. While the truck is making these deliveries, a similar rack can be loaded for the next trip, thereby expediting deliveries and saving considerable time on the part of both the shipping department and the delivery clerks.

A rearwardly extending canopy 84 is preferably provided formed either integral with or attached to the dome 20 which covers the cylindrical body so that when the rear doors are opened, the operator or delivery man will be in comparative shelter even on rainy days or the like.

It will be seen that herein is provided a distinct advance in the art of delivering commodities, particularly bakery goods such as pies, as in the pie wagons heretofore used more than one-half of the available space was taken up by an aisle which ran through the length of the wagon, which aisle was considered necessary for the purpose of providing access of the operator to cabinets or storage shelves built in the sides of the wagon, whereby pies of various flavors and fillings could be selected.

In the present device, the necessity for the aisle is absolutely eliminated and the corresponding space saved for storage purposes whereby greatly increased capacity results, allowing the use of smaller and lighter trucks for delivery of the same number of pies or allowing of the handling of practically double the number of pies or other commodities with the same size of truck. Almost any article of merchandise which renders itself to delivery purposes in quantities can be economically transported and handled in a vehicle of this size, which should prove itself quite advantageous for delivery purposes of all kinds.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In a delivery vehicle, a cylindrical body, a storage rack rotatably mounted in the body and swiveled supporting wheels for the rack, together with a circular track in the body for maintaining the swiveled wheels and the rack in desired position in the body, together with switch means in the circular track for allowing of the withdrawal of the rack from the body.

2. A delivery truck, including a removable rotatable storage rack, and a plurality of article receiving shelves on the rack, a circular track for the rack and means for locking the rack against undesirable rotation while in the vehicle, said means comprising switches in the track.

WILLIAM EHRLICH.